United States Patent [19]
Musbach et al.

[11] Patent Number: 5,790,068
[45] Date of Patent: Aug. 4, 1998

[54] AFC CONTROL SWITCHING CIRCUIT

[75] Inventors: Milton W. Musbach; Howard A. Roberson, both of Pittsfield, Mass.

[73] Assignee: The United States of America as represented by the Secretary of the Navy, Washington, D.C.

[21] Appl. No.: 97,478

[22] Filed: Dec. 28, 1970

[51] Int. Cl.$^6$ .............................. G01S 13/72; G01S 15/66
[52] U.S. Cl. .......................... 342/199; 367/99; 367/101; 342/13; 342/100; 342/101
[58] Field of Search ........................ 325/418, 419; 340/3 D; 114/23; 244/3.19; 331/30; 342/13, 18, 19, 22, 92, 98, 99, 100, 101, 199, 174; 367/101, 99

[56] References Cited

U.S. PATENT DOCUMENTS

| | | | |
|---|---|---|---|
| 3,045,625 | 7/1962 | Smith, Jr. ............................ | 114/23 |
| 3,229,657 | 1/1966 | Brooks et al. ....................... | 114/23 |
| 3,573,826 | 4/1971 | Fredericks et al. ................. | 342/174 |

*Primary Examiner*—John B. Sotomayor
*Attorney, Agent, or Firm*—Harvey Fendelman; Thomas Glenn Keough

[57] ABSTRACT

An automatic frequency control loop for maintaining a center carrier frequency fed to a notch filter for blocking out system reverberation includes, along with the conventional elements found in an automatic frequency control loop, a control switching circuit responsive to excessive frequency deviations beyond a predetermined range as established in the AFC loop. Such excessive deviations are likely present during the time when little, if any, reverberation energy is received by a receiver carried on a moving platform, or, when signals originating from high energy level sources of countermeasure energy are being received. An interposed, selective device is included in the control switching circuit to permit operation in one of several modes as the situation demands. Including the control switching circuit in an active homing torpedo is the preferred application, although the teachings of the invention are applicable to all situations when own doppler nullification and reverberation damping is desired.

5 Claims, 2 Drawing Sheets

AFC CONTROL SWITCHING CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Most platforms carrying active sonar systems, such as active homing torpedoes, are confronted with nullifying the frequency shift attributed to their relative speed (platform velocity speed) and the frequency shifts attributed to the platform's velocity and the boundaries of the media, more properly known by the term "reverberation". AFC loops are routinely included in platform-carried receivers of projected sonar energy for Own Doppler Nullifier (ODN) and for attenuation of the reverberation energy. Usually, the system's reverberation is sampled during a discrete interval, a reverberation-limited interval, after the projection of energy and automatic adjustment of the ODN loop frequency is made via an AFC circuit. Once the frequency of a reverberation energy is determined, a single notch filter having a maximum attenuation embracing the same frequency band as the reverberation energy, "whitens out" or masks the reverberation energy from following detection circuitry allowing the circuitry to concern itself with target signals. The typical AFC loop includes, as fundamental elements, a mixer, a discriminator, an integrator, and a local oscillator serially connected to provide an intermediate frequency to be heterodyned with the incoming information signal. The heterodyned information signal is fed through the notch filter which masks out the reverberation energy permitting the processing of more reliable information. In the aforedescribed circuit, where the reverberation level is high, the system tracks well. As reverberation energy decays into noise, however, or any other off reverberation frequency, such as from a countermeasure, the loop pulls off in frequency and shifts the incoming heterodyned signal in a random, undesired fashion. Another undesirable feature, particularly noted in sonar systems, became apparent in that at the start of each active "ping" cycle, the reverberation energy of the loop drifts out of the notch established by the notch filter. Under these circumstances, irrespective of the fact that the loop may correct fairly quickly after transmit time, the reverberation energy not notched out of the following detection circuitry, results in false alarms in the detection gates.

SUMMARY OF THE INVENTION

The present invention is directed to providing an improvement in AFC loops for masking reverberation energy which includes a serially connected mixer, discriminator, integrator, and local oscillator for heterodyning a received sonar signal and passing the heterodyned received signal to a notch filter having an attenuation band centered on a constant center frequency. An AFC control switching circuit is serially interposed in the loop and includes a first means responsive to deviations from the center frequency by the heterodyned received signal to generate a first control signal. A second means is responsive to analogue velocity signals, representative of relative velocity of the platform, and the first control signals to generate a second control signal when their difference is greater than, or less than, a predetermined range. A switching means receives the first and second control signals and passes the first control signal in the absence of the second control signal and blocks the first control signal in the presence of the second signal. Following the switching means, a summing means receives the algebraic sum of the switching means output and the analogue velocity signals to control the local oscillator to generate a suitable heterodyning frequency.

A prime object of the invention is to provide an improved AFC loop having simplified circuitry ensuring minimal drift of attenuation of reverberation energy.

Yet another object is to provide an improved AFC circuit passing a heterodyned IF frequency to a single notch filter throughout the transmit-receive cycle resulting in fewer instances of false information.

Still another object is to provide an improved AFC loop having the capability to be selectively switched to another mode of control when energy outside of the expected band of reverberation energy causes a drifting or pulling of the loop.

A further object is to provide an improved AFC loop including bandwidth limiting devices for improving the overall signal to noise ratio and to further provide more rejection of out of band signals.

These and other objects of the invention will become readily apparent from the drawings when taken with the ensuing description.

DESCRIPTION OF THE PREFERRED EMBODIMENT

Figure 1:
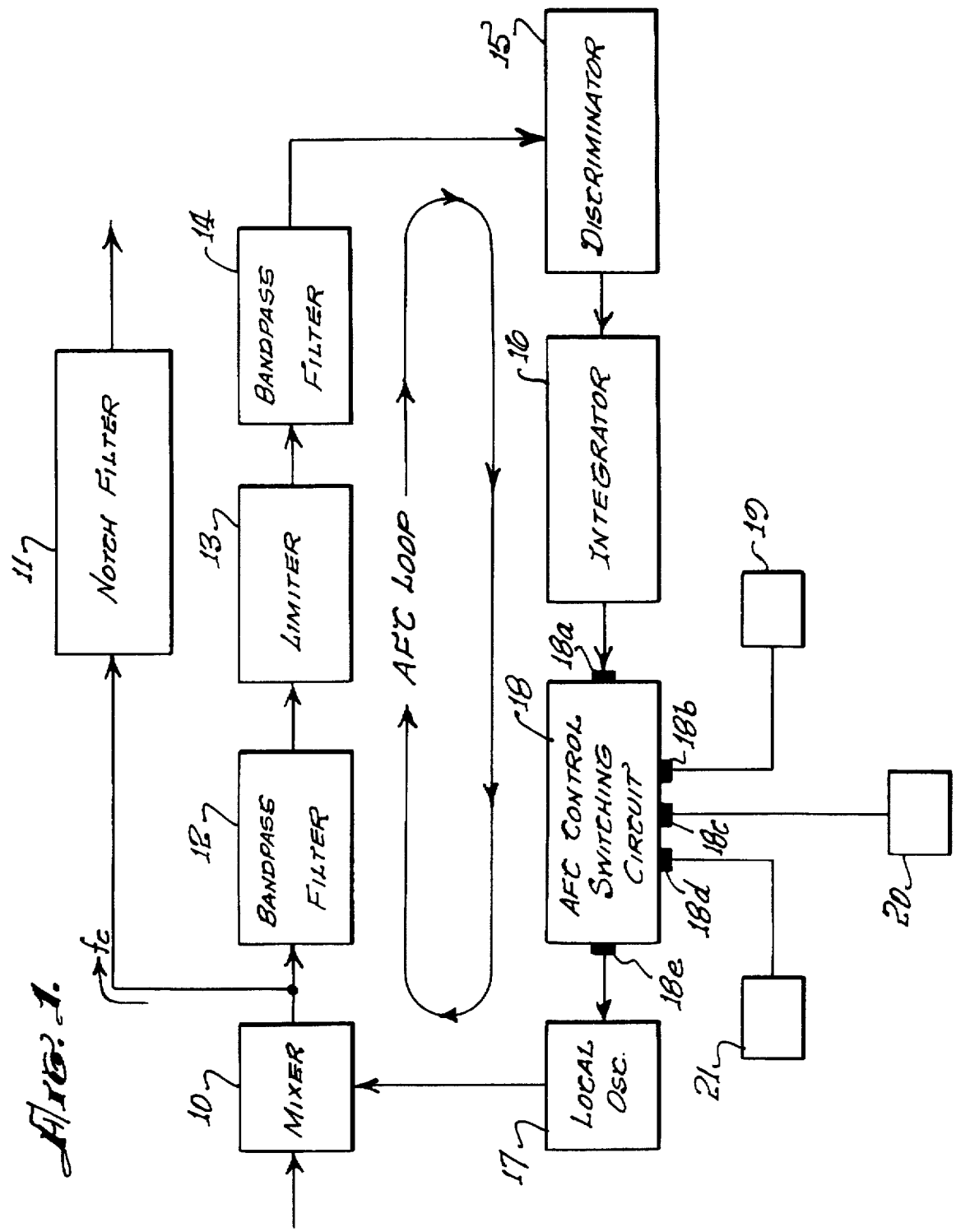
FIG. 1 is a block diagram of the improved AFC loop.
Figure 2:
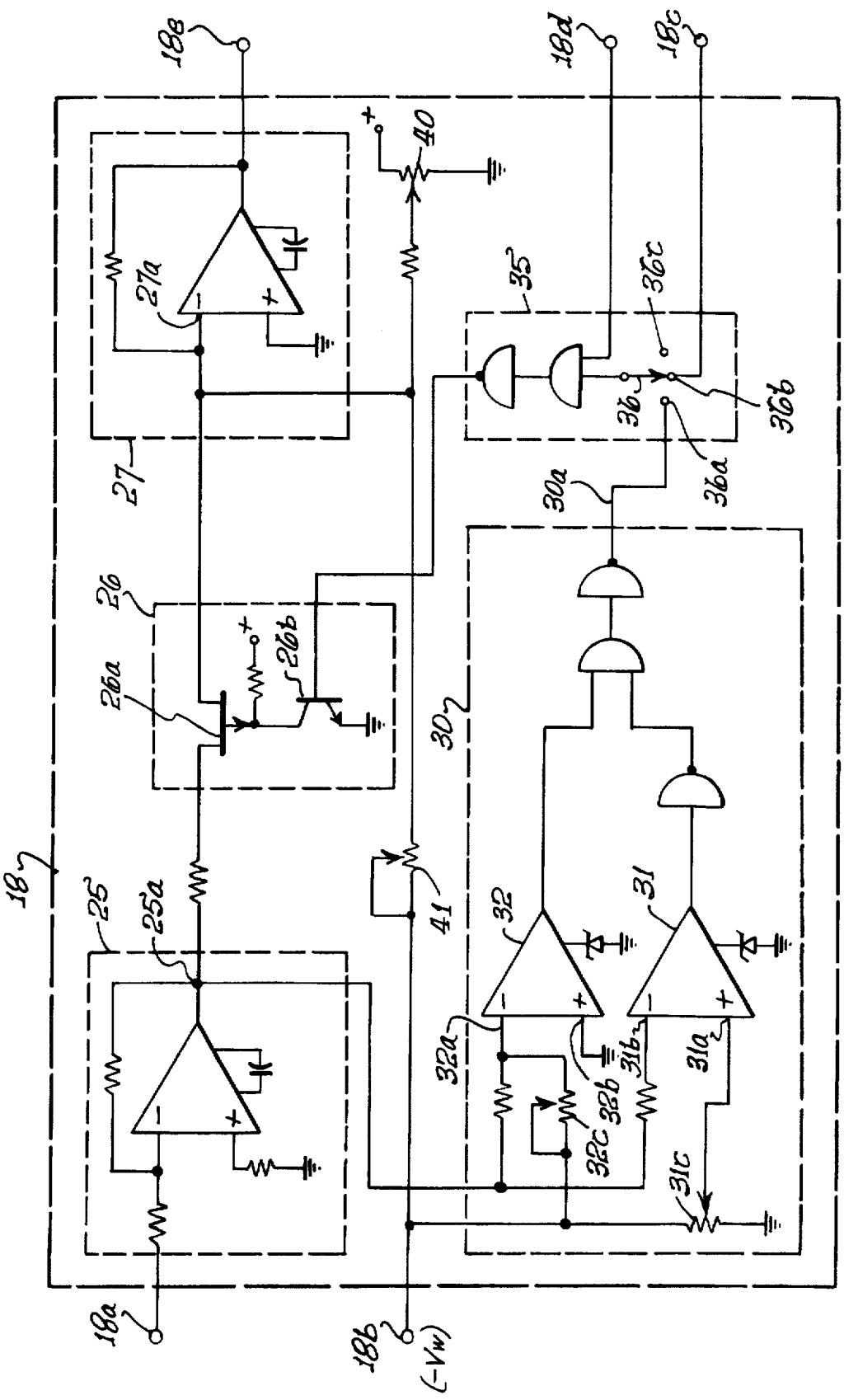
FIG. 2 is a schematic depiction of the control switching circuit.

The disclosed invention is particularly adapted to a receiver portion of an active mode sonar system carried on a homing torpedo. Although the weapon platform, a homing torpedo, has found inclusion of the invention particularly advantageous, it is apparent that the improved operating characteristics afforded by the invention are adaptable to other systems.

One of the most obvious problems facing designers of sonar tracking systems operating in the active mode, is distinguishing a true target echo, or information signal, from reverberation energy bouncing back from the boundaries of and stationary objects in a medium. In addition, since the homing torpedo is moving as it projects and receives acoustic energy, an "own doppler shift" is introduced into the received signal which must be accounted for to avoid false information indications. In the receiver portion of an active sonar system, a hydrophone receives reflections of acoustic energy attributed to the boundaries and to the target. Since the target is usually moving, the frequency shift of the reflected signal attributed to the target is different than frequency shifts attributed to reflections from the stationary boundaries of the medium, e.g., the surface of the water, the bottom, and floating objects.

More contemporary active sonar systems heterodyne the received acoustic energy to an intermediate frequency (IF) for signal processing to simplify filter complexity, to reduce coupling effects among following circuitry, and to decrease bandwidth, etc. The heterodyned received acoustic energy is fed to a serially connected limiter, discriminator, and integrator to derive an oscillator control signal for driving a local oscillator. In response to the driving signal, the local oscillator generates a heterodyning signal and passes it to the mixer to maintain the heterodyned IF within predetermined limits. Heterodyning the incoming signal to within a single predetermined bandwidth allows the use of only a single notch filter designed to provide maximum attenuation within the reverberation frequency band and slight, if any, attenuation to the information signals which are fed to following detection and processing circuitry.

A single notch filter for whiting out reverberation energy greatly simplifies the complexity of the receiver to achieve highly reliable indications of target information. A bank of such filters or filters which track the received reverberation is too bulky and expensive to be included in a homing torpedo. As long as reverberation energy is high throughout the receive portion of the transmit-receive cycle, and is detectable in the heterodyned received signal, the AFC loop is stable to whiten out the unwanted reverberation energy. However, as incoming reverberation energy is diminished, the AFC loop tends to wander away from the anticipated reverberation energy band and either masks target information or passes reverberation energy to follow detection circuitry giving false indications of targets.

Improved operation is ensured by including an AFC control switching circuit 18. The control switching circuit is responsive to an AFC control signal at input terminal 18a, generated from conventionally coupled limiter 13, discriminator 15 and integrator 16, to feed an oscillator control signal to local oscillator 17 when the reverberation energy is within preset limits. The representative signal generated by the local oscillator is heterodyned with the incoming signal to maintain the heterodyned signal, coupled to notch filter 11, within the predetermined bandwidth. To elaborate, an operational amplifier circuit 25 coupled to input terminal 18a, functioning as an inverter and scaler, responds to the impressed AFC signal to produce a first control signal at output point 25a. The first control signal is fed to a following switching arrangement 26, consisting of an FET switch 26a controlled by a transistor 26b joined to the FET's gate-to-ground. Transistor 26b, normally conducting to maintain the FET "on", allows passage of the first control signal to a summing operational amplifier circuit 27 at its input terminal 27a. In the absence of any other signal, an oscillator control signal of the proper magnitude is a function of the AFC signal and is presented at terminal 18e to control local oscillator 17 to provide a suitable heterodyned IF signal to notch filter 11 via mixer 10.

As mentioned above, when the sonar system functions in the active mode, there is a period, designated the reverberation-limited interval, during which reverberation energy is sampled and a portion of the sampled signal is passed through the AFC loop to maintain maximum attenuation of the reverberation energy in notch filter 11.

The improvement over contemporary systems afforded by control switching circuit 18 becomes apparent by including a bi-level sensor circuit 30 coupled to switching arrangement 26 to selectively decouple the first control signal in the presence of certain conditions and to control the heterodyning frequency as a function of relative platform velocity.

In the preferred application of the invention, these conditions were satisfied when the sum of an analogue velocity signal, $-V_w$, representative of platform velocity, and the first control signal was greater than or less than a predetermined range. The analogue velocity signal, produced in a velocity sensor 19, was fed to analogue velocity input terminal 18b and to an overlevel sensor operational amplifier 31 and an underlevel sensor operational amplifier 32. Operational amplifier 31 would conduct when the analogue velocity signal appearing at input terminal 31a was positive with respect to the first control signal representing AFC wandering outside of a predetermined range fed to input terminal 31b. A potentiometer 31c enabled precise adjustment of the circuit. Similarly, operational amplifier 32 would conduct when the sum of the analogue velocity signals and the first control signal was negative at input terminal 32a with respect to ground terminal 32b. A potentiometer 32c enables precise adjustment and further definition of the predetermined range.

Having either operational amplifier 31 or 32 conducting, passes a second control signal to the output terminal 30a and to selective switching circuit 35 at position 36a of switch 36.

Connecting switch 36 to position 36a feeds the second control signal to transistor 26b inhibiting the passing of first control signal to summing operational amplifier circuit 27. Coupling the analogue velocity signal directly to input 27a tends to stabilize the oscillator control signal as a function of platform velocity and the AFC circuit inhibits the generation of an overlevel or underlevel oscillator control signal. As mentioned before, the obvious disadvantage of an overlevel or underlevel signal is that the heterodyning signal causes pulling or drifting that may cause attenuation of the target energy in notch filter 11.

When the second control signal is impressed to the switching arrangement at output terminal 30a, FET 26a is switched off and the first control signal appearing at output point 25a is switched out of the AFC loop making the composite AFC control signal appearing on output terminal 18e a function of weapon platform velocity.

Including switch 36 in the switching arrangement permits operation in two other modes and connection to the different modes is optionally completed manually or automatically upon receipt of a command signal.

When countermeasure energy is detected by a countermeasure sensor 20, sensitive, for example, to extremely high energy radiations, responsive circuitry completes a circuit through position 36b to switching arrangement 26. The reason such a connection is desirable is that when a high intensity source of countermeasure energy is received by the system, a conventional AFC loop, not having the switching capability afforded by control switching circuit 18, drifts to the passband established by the countermeasure energy and the attenuation band is shifted to notch out the countermeasure energy or target information may be shifted outside the detection band of the circuitry following notch filter 11. Thus, under certain circumstances it is desired to ignore the countermeasure energy and establish the AFC control signal as a function of platform velocity, position 36b of selective switching circuit 35 passes a second control signal, in this case originating from countermeasure energy detector 20, to inhibit the transfer of the first control signal through FET 26a and the oscillator control signal appearing at terminal 18e is, once again, a function of platform velocity.

Selective switching circuit 35 also possesses the capability for making AFC control a function of the output signal appearing at output point 25a and the analogue velocity signal by switching switch 36 to position 36c, which puts an open on that gate input.

A reset pulse generated in reset circuit 21 is fed to the control switching circuit via input terminal 18d, making the circuit responsive to the analogue velocity signal during the transmit interval.

Further overall system performance is enhanced by including a first bandwidth limiting filter 12 before the limiter to prevent the capture of energy outside the band needed for operation of the loop.

Including a second bandwidth limiting filter 14 after the limiter results in improved system operation by eliminating harmonics in the system.

Preadjustment of the system to center the heterodyned center frequency is provided for by having an offset adjustment potentiometer 40 and a slope adjustment potentiometer 41 connected responsive to the analogue velocity signal.

Obviously, many modifications and variations of the present invention are possible in the light of the above teachings, and, it is therefore understood that within the scope of the disclosed inventive concept, the invention may be practiced otherwise than as specifically described.

What is claimed is:

1. In an AFC loop, responsive to a frequency varying received signal, including a serially connected mixer, discriminator, integrator, and local oscillator for heterodyning said received signal and passing the heterodyned received signal to a notch filter having an attenuation band centered on a constant center frequency, an improvement therefor is provided comprising:

an AFC control switching circuit serially interposed in said AFC loop having, first means responsive to voltages representative of frequency deviations from said center frequency by said heterodyned received signal to generate a first control signal, a source of analogue velocity signals representative of relative velocity, a second means responsive to said velocity signals and said first control signal to generate a second control signal when their difference is greater than and less than a predetermined range, a switching means connected to receive said first control signal and said second control signal for passing said first control signal in the absence of said second control signal and blocking said first control signal in the presence of said second control signal, and summing means connected to said switching means and said source of analogue velocity signals to feed an oscillator control signal to said local oscillator being the algebraic sum of said first control signal, said second control signal, and said velocity signals, to pass a suitable heterodyning frequency to said mixer for maintaining said constant center frequency.

2. An AFC loop according to claim 1 in which said AFC control switching circuit further includes, selective means interposed between the second responsive means and said switching means for selectively blocking said second control signal from said summing means making said oscillator control signal a function of said first control signal and said velocity signals.

3. An AFC loop according to claim 2 in which said AFC control switching circuit further includes, a source of signals representative of countermeasure energy connected to said selective means upon being connected to said switching means, blocking said first control signal.

4. An AFC loop according to claim 3 further including:

at least one bandpass filter serially connected before the limiter for improving loop performance.

5. An AFC loop according to claim 4 in which said second responsive means includes a pair of operational amplifiers one being responsive to said first control signal when it is greater than a predetermined level to generate said second control signal and the other being responsive to said first control signal when it is less than a predetermined level to generate said second control signal.

* * * * *